UNITED STATES PATENT OFFICE.

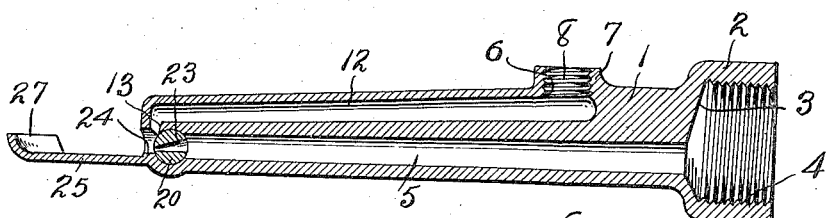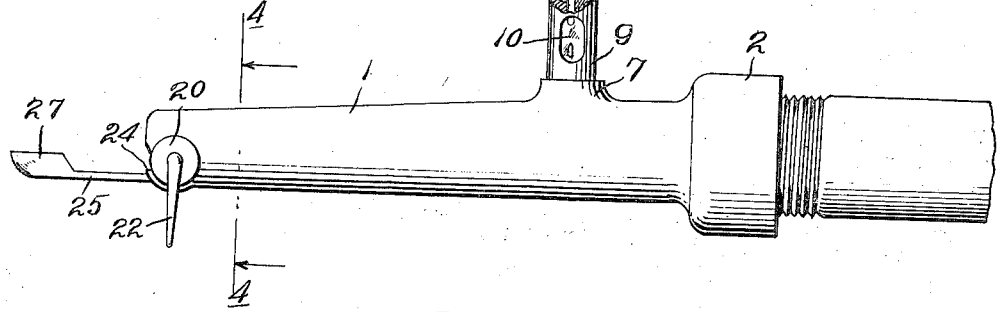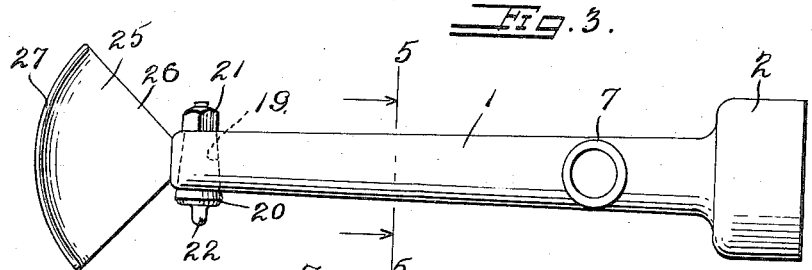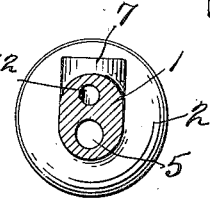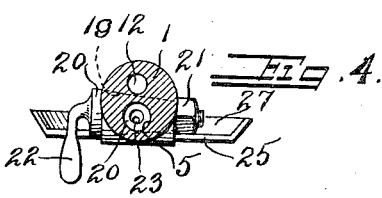

ARTHUR ENGELMANN, OF GLENDALE, NEW YORK.

INSECTICIDE-SPRAYER.

1,179,905.

Specification of Letters Patent.  Patented Apr. 18, 1916.

Application filed January 29, 1915. Serial No. 5,089.

*To all whom it may concern:*

Be it known that I, ARTHUR ENGELMANN, a citizen of the United States, residing at Glendale, Long Island, in the county of Queens and State of New York, have invented certain new and useful Improvements in Insecticide-Sprayers, of which the following is a specification.

My invention relates to spraying devices and more particularly to that type for mixing water with an insecticide or other compound and finally distributing the mixture in a spray.

The primary object of my invention resides in the provision of an improved device that is removably associated with a water supply pipe, the device also having novel means thereon for receiving and conducting an insecticide, fertilizer, soap or other compound thereof and permitting the compound to be mixed with the water flowing therethrough and finally distributing the same in a regulated spray about plants for exterminating insects with which the plants are infested, that is assuming that an insecticide is being used; however, should another compound be used the device adapts itself for carrying out the functions of that particular compound.

Another object of my invention resides in the provision of a novel means for controlling the flow of water through the device and also regulating the spray.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—Figure 1 is a longitudinal, central, sectional view of the body of my invention. Fig. 2 is a side elevational view of my invention applied to an end of a water supply pipe. Fig. 3 is a top plan view of my invention with the cup removed. Fig. 4 is a transverse, sectional view of my invention taken on line 4—4 of Fig. 2 looking in the direction in which the arrow points. Fig. 5 is a transverse sectional view taken on line 5—5 of Fig. 3 and looking in the direction in which the arrow points.

Referring more particularly to the drawings in which similar reference numerals designate like or corresponding parts throughout the different views, I provide an elongated and tapering cylindrical body 1, formed preferably of any desirable metal, having one end thereof enlarged at 2 and provided with an inwardly extending recess 3. The recess 3 has a plurality of internal screw threads 4 for facilitating the detachable association of the body with a water supply pipe. The body is also provided with a longitudinally extending channel 5 which extends throughout the length thereof and communicates with the water supply pipe so as to allow water to enter the inlet and flow therefrom. The body is further provided with an opening 6 about which is formed an upstanding collar 7 the longitudinal axis of which is arranged at right angles to the longitudinal axis of the chamber, and which collar is arranged in proximity to the enlarged end 2. Removably secured within the collar preferably by means of screw threads 8 is a tube 9 having a sight 10 therein for permitting the determination of the quantity of an insecticide or other compound that is falling from the cup 11, which latter is connected to the upper edge of the sleeve 9. The opening 6 constitutes a suitable means for establishing a communication between the cup 11 and the channel 12 extending longitudinally through the body 1 at a slight inclination and in spaced relation to the water channel 5. The channel 12 extends approximately to the outer end of the body where it is distorted and arranged in communication with the water channel 5 as shown at 13 in Fig. 1 of the accompanying drawings.

In order to regulate the amount of insecticide or other compound dispensed from the cup 11 I have provided a needle valve 14 having a stem screw threaded through the cover 15 of the cup, the extreme inner end of the valve engaging in the opening 16 formed at the apex of the conically shaped bottom 17 of the cup which apex is positioned centrally within the tube 9. By engaging the knurled head 18 at the upper end of the stem the valve can be adjusted so as to regulate the number of drops per minute that are dispensed from the cup into the insecticide channel 12 and consequently the channel 5.

For the purpose of controlling the flow of water through the channel 5 I have formed a tapering opening 19 transversely through the body and intersecting channel 5, the opening having rotatably mounted therein a tapering plug 30 the inner end of which is reduced and screw threaded to receive a nut or like adjusting element 21 for facilitating the removable securing of the plug in position. A handle 22 is formed integral with the enlarged end of the plug and positioned at right angles to the longitudinal axis thereof, the said handle being engagable when it is desired to rotate the plug. The plug is also provided with a tapering opening 23 which is arranged transversely therethrough for allowing water passing through the channel 5 to be dispensed therefrom. A transversely extending rib 24 is formed integral with the lower periphery of the channel 5 between the opening 19 and the outer end of the body which constitutes a suitable spray regulator for coöperation with the small end of the transverse opening 23 for governing the flow of the mixture of the insecticide and the water preparatory to the mixture flowing from the body.

In order to evenly distribute the mixture in a regulated spray about a comparatively large area I have formed integral with the lower portion of the body a substantially fan shaped distributing plate 25, the sides 26 of which diverge toward their outer arcuate edge. The outer end of the plate is bent upwardly as at 27 which inclined end because of the impetus of the water from the body, creates a finer spray.

The operation of my invention is as follows: Assuming that the device is associated with the water supply pipe as shown to advantage in Fig. 2 of the drawings the water flows through the channel, the said flow being regulated by the valve 20. Preparatory to the actuation of the valve 20 the needle valve 18 is adjusted so that the desired amount of insecticide may be dispensed from the cup 11. The insecticide thus dispensed will flow through the channel 12 because of the inclination of the same and finally communicate with the valve 20 and become mixed with the water flowing through the transverse opening 23 in the valve 20. As the mixture issues from the body, the valve is arranged so that the liquid is directed by the opening in the valve either toward or above the rib, thereby serving as a means for controlling the flow and for altering the spraying action. The mixture is now projected or delivered across the distributing plate 25 whereupon it strikes the inclination 27 and due to the impetus a finer spray is created. The peculiar formation of the plate also facilitates the spraying of a comparatively large area.

Although I have shown and described the preferred embodiment of my invention I desire it to be understood that I do not wish to be limited to the exact details shown.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. An insecticide spray including a body for detachable association with a water supply pipe and provided with longitudinal channels for facilitating the flowing of liquids therethrough, one of said channels extending throughout the length of the body for allowing water to pass therethrough, an insecticide cup arranged in communication with the other of said channels, means for controlling the flow of liquid through one of said channels, the insecticide channel communicating with the water channel adjacent said controlling means, means coöperating with the means for regulating the flow of liquid as it issues from the body, and a distributing plate integral with and extending beyond the body.

2. An insecticide spray including an elongated body for removable association with a water supply pipe said body having communicating insecticide and water channels extending therethrough, a valve plug rotatably mounted transversely through the body adjacent the point of communication of the channels for regulating the flow of liquid through one of the channels, a transverse rib arranged adjacent the valve coöperating with the opening in the valve for regulating the flow of liquid, and a longitudinally extending distributing plate on the outer end of the body.

In testimony whereof I affix my signature in presence of two witnesses.

ARTHUR ENGELMANN.

Witnesses:
   ARTHUR S. DAVIS,
   JOHN HENRY SPILKER.